Figure 3:
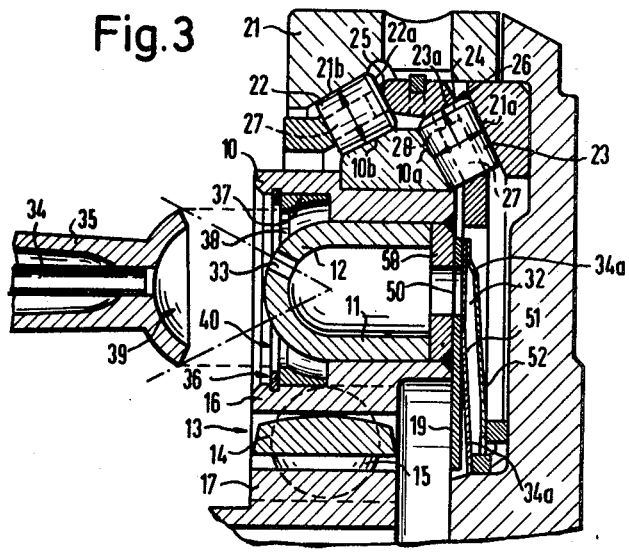

United States Patent
Papst

[15] 3,678,807
[45] July 25, 1972

[54] PISTON MOTOR WITH SWASH-PLATE ENGINE ASSEMBLY

[72] Inventor: Hermann Ernst Robert Papst, Karl-Maier Strasse 1, St. Georgen, Black Forest, Germany

[22] Filed: Dec. 29, 1969

[21] Appl. No.: 888,382

[52] U.S. Cl. ..........................................92/70, 74/60, 91/499
[51] Int. Cl. ..........................................................F01b 3/00
[58] Field of Search ....................92/70, 71, 57; 91/499, 476, 91/475, 472, 505, 480, 481, 496; 74/60

[56] References Cited

UNITED STATES PATENTS

| | | | |
|---|---|---|---|
| 3,333,478 | 8/1967 | Papst | 91/499 |
| 3,186,352 | 6/1965 | Anderson | 91/507 |
| 2,956,845 | 10/1960 | Wahlmark | 74/60 |
| 2,465,510 | 3/1949 | Bonnafe | 74/60 |
| 2,280,875 | 4/1942 | Wahlmark | 74/60 |
| 2,231,100 | 2/1941 | Wahlmark | 92/71 |
| 1,819,715 | 7/1931 | Le Bret | 74/60 |

Primary Examiner—Martin P. Schwadron
Assistant Examiner—Ronald H. Lazarus
Attorney—Cushman, Darby & Cushman

[57] ABSTRACT

The invention deals with a basic improvement of piston motors with swash-plate engine assembly by achieving through a novel construction of the swash-plate engine assembly both an even distribution of the piston forces (combustion pressure peaks) on the hitherto very variably stained bearing elements between the wobble ring and swash plate as well as a considerable reduction of the mass forces, which, if followed by an increased useful life, makes possible considerably higher operational r.p.m.'s, therefore also a higher specific weight (unit power) than in the case of the arrangements known hitherto. The advantageous shaping of the bearing elements likewise contributes to this.

The arrangement according to the invention of the shaft with the swash plates, inclusive of the most simple and spatially compact conditions, will not permit the combustion forces to act either on the housing walls for the purpose of sound radiation nor on the shaft bearing, not will it permit them to reach the outside via the connecting shaft.

20 Claims, 8 Drawing Figures

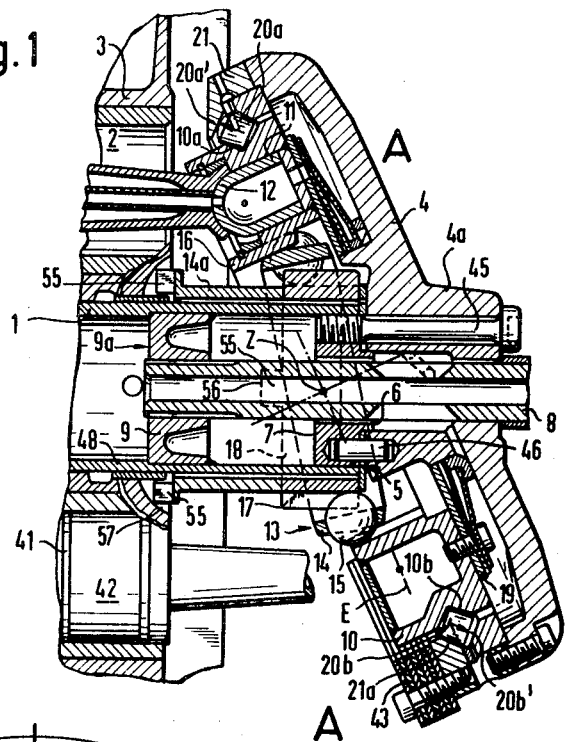

Hermann Ernst Robert Papst
INVENTOR:

BY:
Cushman, Darby & Cushman
Attorneys

PISTON MOTOR WITH SWASH-PLATE ENGINE ASSEMBLY

The invention relates to a piston motor with swash-plate engine assembly, for example a two stroke combustion engine or a steam engine with six cylinders in opposed piston arrangement, whose pistons have been arranged apparallel to the shaft and around it concentrically in a circle and are guided in the fixed cylinder block and connected with a wobble ring carrying the step bearings of the connecting rod, said ring carrying bearing surfaces on its outside to guide it over bearing elements in a bearing ring connected firmly with the swash plate and the shaft, whereby the wobble ring on its inside is held firmly rotatably on the cylinder block by means of a device aligned to its wobble center.

Hitherto only piston motors of this type with corresponding swash-plate mechanisms (crankless or swash-plate mechanism) have been known, whose wobble rings (cage or wobble ring) are developed as relatively flat annular disks (U.S. Pat. No. 2,475,295), which are in frictional connection with a much stronger swash plate connected with the shaft. Such wobble rings have flat axial bearings on their outside edge (U.S. Pat. Nos. 1,808,664 and 3,333,478).

The swash-plate engine assemblies of all these piston motors have, corresponding to the flat development of their wobble ring, a thick walled and possibly specially strengthened construction of their rotational swash plate, in order to be able to support the gas pressure forces transmitted from the piston and the mass forces on the wobble ring.

However, such an arrangement can not suffice for the extremely high and suddenly acting combustion pressures (power peaks) especially in the case of diesel engines, since the pressure of the connecting rod, being in its power stroke, is transferred to a single or also a few bearing elements within the area of the connecting rod via the flat yielding wobble ring, through the unyielding swash plate, so that these bearing elements will be overloaded and will achieve a short useful life, because, in consequence of the yielding of the flat wobble ring, the adjoining bearing elements will be put under much less a strain and do not assist in bearing the forces. On the other hand, however, in the case of a strengthened construction of flat wobble rings, their mass would be increased excessively and, as a result of that, again the strain on the bearing elements would be increased to an impermissible degree, since the bearing of the wobble ring must transfer the gas forces and the mass forces.

In the same manner the mass of the wobble ring would still be additionally increased if the connecting rod bearings were attached in front of the wobble ring as an additional mass. The mass forces rise quadratically in the case of increased r.p.m., with the r.p.m., they therefore become critically high. For these reasons piston motors with swash-plate engine assemblies hitherto could not run fast enough and therefore, as compared to piston motors with crank shaft, they were not sufficiently efficient.

The swash-plate engine assemblies of all these piston motors have a thick walled and perhaps still specially strengthened construction of their rotational swash plate corresponding to the flat development of their wobble ring, in order to be able to support the forces of gas pressure transmitted by the pistons and the mass forces on the wobble ring.

It is the task of the invention to create a piston motor with swash-plate engine assembly, in which these disadvantages of the known piston motors are avoided or properly decreased. The piston motor according to the invention is supposed to assure in a constructionally optimum manner a more shockless and noiseless running, and thus simultaneously an increased r.p.m. (about 6,000 r.p.m) as well as a greater engine performance with a prolonged useful life.

For this purpose and for a sufficient useful life of the large antifriction or ball bearings at a high r.p.m., it is necessary that the peak load of the roll bodies in the case of combustion pressure peaks would constitute as small as possible a part of the permissible critical load, so that the mass forces increasing rapidly at a high r.p.m. can still be absorbed without the useful life becoming too low, for example for use in a motor vehicle.

Beyond that, the piston motor according to the invention is also supposed to be spatially compact and simple to mount.

The invention lies in the improvement of the initially mentioned type of a piston motor with swash-plate engine assembly and has been characterized in the first place through the fact, that the wobble ring is light and has a great bending resistance and torsional rigidity by having in the cross section a box-shaped hollow section, preferably completely closed within itself but at least partly closed.

At the same time, the wobble ring may have a square cross section. Also, the step bearings of the connecting rod can be arranged within the box-like profile of the wobble ring.

With this development of the wobble ring according to the invention one will basically achieve a high torsional rigidity and bending resistance without increase in weight, so that the great forces exerted by the individual pistons locally and preferably in the upper and lower dead center are transferred via relatively many bearing elements and thus via a broad sector of the bearing surface of the wobble ring to the swash plate which is connected with the shaft.

The peak pressures under the connecting rods in the dead center are therefore distributed to many bearing bodies without overloading individual ones, because of the gas or mass forces (ignition pressure, high r.p.m.'s) acting there particularly strongly.

In a further development of the invention, the swash plate preferably has a greater elastic resilience than the wobble ring, because the latter can not attain an endlessly high rigidity despite its hollow box profile. The swash plate therefore collaborates essentially through its lesser strength or through selection of a raw material with a lesser elasticity module in a broad surface distribution of the forces to the bearing bodies or the bearing surfaces and in making the peak forces harmless.

The swash plate therefore can be produced advantageously also from an aluminum, beryllium, magnesium or titanium alloy. But one can also achieve a certain resilience in a known manner in the case of steel through a high strength and lower thickness of the wall. The swash plate therefore has been developed essentially as a relatively thin and flat disk, in order to achieve this certain resilience as compared to the far greater rigidity of the wobble ring.

Because of the high dimensional stability of the wobble ring according to the invention, it can also be produced in order to save more in weight from light metal alloys, for example aluminum, beryllium, magnesium, titanium, onto which bearing, metal surfaces consisting of a harder metal can be shrunk on or stuck on.

At the same time, in order to save weight and above all also for the purpose of an even distribution of weight, the individual elements of the swash-plate engine assembly can be joined together into specially light and solid elements of the swash-plate engine assembly free of residual stress through connection by means of energy radiation welding.

A saving in weight will result in considerably lower moments of inertia, which make possible a higher r.p.m, thus also a higher engine performance and at the same time permit a more compact structure of the swash-plate engine assembly. This more compact structure, facilitating the mounting at the same time, is due above all to the fact that the hub of the rotational swash plate on its front side is attached on the hollow shaft with only a slight thickness of the wall. At the same time, however, one must absolutely avoid a bracing of the swash plate during its attachment to the shaft. In a development of the invention this is accomplished by attaching this swash plate to a thick hollow shaft with only a dual bearing close to its ends through front attachment by means of high prestressed screws.

In this manner one will create a system held without outside force and only in two bearings, and which therefore swings completely free without weak points due to fatigue, from which the engine performance is released via the stub shafts attached in the hub of the rotational swash plates. This combination of a vibrational system with a stub shaft for tapping the motor performance is particularly advantageous. At the same time the stub shaft can also be attached slightly movably angularly or in some other manner in the hub without a radial pressure.

This compact manner of construction is enhanced essentially through the fact that the outside counterbearing of the step bearing of the connecting rod is formed by a bearing ring in which the opening, through which the connecting rod projects from the step bearing of the connecting rod, is at least exactly as large as the outside diameter of the pan located on the connecting rod, but is smaller than the operating circle covered by this outside diameter during operation of the piston motor, and that the step bearing of the connecting rod thus is positively blocked in every operational position.

As a result of that, the bearing boxes of the step bearings of the connecting rod located on said rod, after insertion into the parts of the step bearing of the connecting rod attached to the wobble ring, do no longer have to be secured separately from the outside and assembly space will be saved, and the assembly despite this will be facilitated considerably. The swashplate engine assembly only needs to be moved toward the front side of the shaft in a state maintained perpendicularly in relation to the longitudinal axis of the shaft and the step bearings of the connecting rods have to be inserted into bearing openings on the wobble ring, and then the step bearings of the connecting rod will automatically be completely mounted with the attachment of the wobble ring on the front side of the shaft because of the above mentioned positive locking, after the swash plate inclusive of the wobble ring has been positioned at a slant.

With the development of the wobble ring in its cross section in the manner of a hollow box, and with the particularly strong dimensional stiffening resulting from that, it will also be possible at the same time to make the inside opening of the wobble ring with a larger inside diameter, so that the device can be inserted in the enlarged assembly space resulting therefrom, with the assistance of said device, the wobble ring being held with torsional strength in relation to the cylinders and centrally in relation to its tumbling center, and which therefore absorbs the restoring movement of the wobble ring.

This device may consist of a beveled gear rim set described already in principle in the U.S. Pat. No. 3,333,478, in which a beveled gear rim firmly attached to the wobble ring unrolls during the tumbling movement of the wobble ring against a counterbeveled gear rim, supported torsionally on the motor block. It is important thereby, that the engagement of the gear rim take place essentially in an axial direction, so that the wobble ring remains without compensation in a radial direction in order to withstand a transfer of radial compulsive forces on the power transmitting bearing elements. Such a gear rim device can be reset also in an axial direction within certain limits in the case of phenomena of wear and tear.

The device for the mounting of the wobble ring with torsional strength can however also be made as a ball rockerjoint with axial grooves, with which the restoring moment between the wobble ring and a casing element supported by the motor block is transferred by ball roll bodies guided in cages and lying in pairs of axial grooves. In the case of such a device an economically inexpensive construction and one particularly free of noise will result, where the precise adjustment to the tumbling center, that is to say to the intersecting point of the tumbling middle plane with the axis of the shaft, is noncritical.

The device for the mounting of the wobble ring with torsional strength can however also be a simple universal joint, one effective side for the power of said joint being attached to the motor block and the other effective side for the power to the wobble ring.

The device for the mounting of the wobble ring with torsional strength can for example also be arranged with that of its parts which is supported by the motor block at a small distance right around the hollow shaft, so that it is guided freely in a radial direction and that in this manner no forcing forces can occur and additional strains will be avoided.

Through the outer peripheral surface of the wobble ring, enlarged in an axial direction and given with the development of the wobble ring in the form of a hollow box, the mounting space for the ball bearing-shaped bearing elements between the wobble ring and the rotational swash plate will also be enlarged. In this case it is decisive above all that with the increased r.p.m. according to the invention and the engine performance, these bearing elements must also be adapted, because the higher r.p.m. creates considerably higher centrifugal forces in the case of roller bearing elements, which per force lead to a jamming of the roller bearing elements. This difficulty according to the invention will be eliminated essentially through the fact that the roller bearing elements are given a special support in radial direction.

In detail, this will be achieved according to the invention by the bearing elements or roller bearing elements being developed as ball or roller bearing elements, which are arranged as axially and radially acting bearings on the outside periphery of the wobble ring between a flange-like circumferential ring of the rotational swash plate, encircling the wobble ring from the outside, that they have been rounded off on their radially outside lying sides and that they fit against a support with little friction for support against centrifugal forces.

The swash-plate engine assembly according to the invention can not only be used in the case of combustion engines mentioned initially, but, for example, also in the case of the Stirling engine or the steam engine, whereby the steam supply can be accomplished through the hollow shaft from where it is distributed radially outwardly into the center of the cylinder and where the pertinent control slides can likewise be arranged inside the hollow shaft.

The wobble (tumbling) according to the invention of the described and claimed swash-plate engine assembly can also be of advantage whenever the swash-plate engine assembly is used only individually or also if it is operated from both sides via an individual rotational swash plate arranged between two wobble rings.

In the case of the preferred development as a two-stroke six-cylinder design in opposed piston arrangement and with the 12 cylinders resulting from it altogether, there will develop a motor performance particularly free of vibrations, because the resulting torque will always remain positive and is always subjected to slighter variations. The compact arrangement can also be used quite generally in automobile engineering.

The invention will be described in detail and with pertinent advantages on the basis of drawings in several designs given by way of example.

Figure 4:
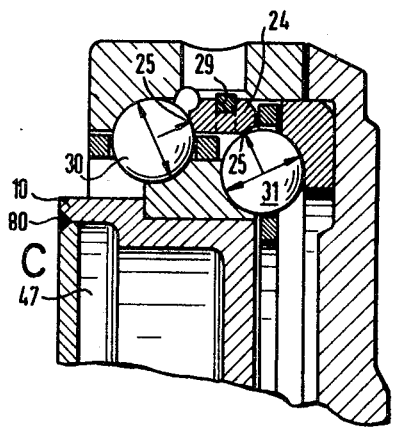
Figure 5:
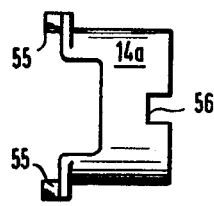
Figure 6:
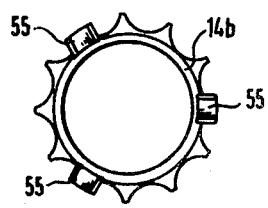
Figure 7:
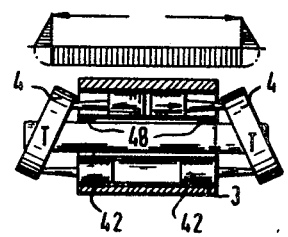
Figure 8:
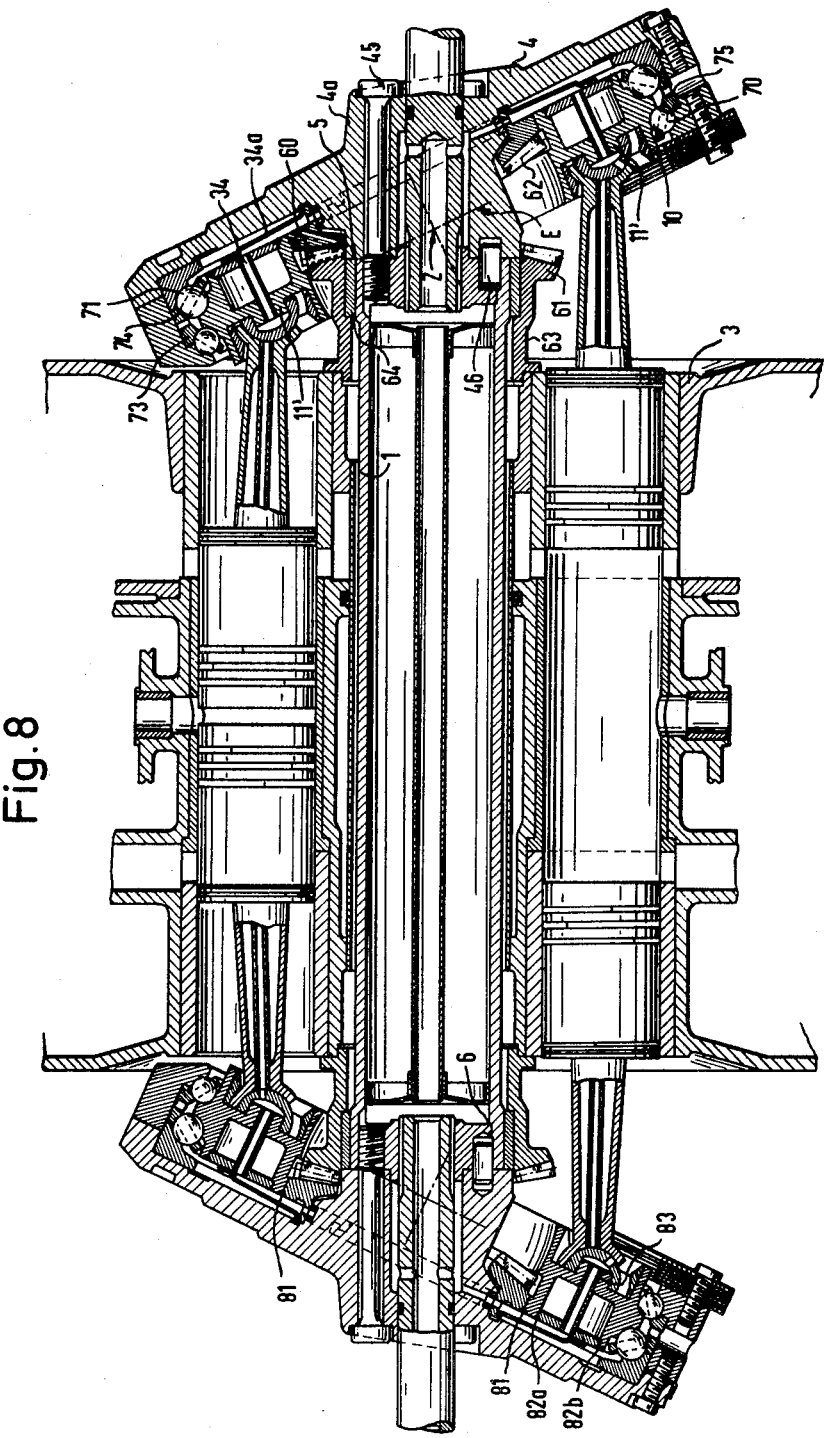

FIG. 1 shows a section along line A—A in FIG. 2, through a piston motor according to the invention, with a swash-plate engine assembly, FIG. 2 shows a view of a wobble ring mounted in a swash-plate engine assembly with a device for mounting of the wobble ring with torsional strength with connecting rod step bearings and with a mass balancing arrangement, whereby to the left and to the right of the intersecting line A—A different designs of a wobble ring according to the invention are shown, FIG. 3 shows a partial cut through the swash-plate engine assembly according to the invention with a design of power transfer elements with tapered roller bearings, FIG. 4 shows a cut according to FIG. 3, in which the power transfer elements have been executed in the form of ball bearings, FIG. 5 shows an intermediate pieces of the sleeve of the piston motor according to the invention shown in FIGS. 1 and 2, FIG. 6 shows a special design of the mounting arrangement of the axial guide bearing shown in FIGS. 1 and 2, however with guide grooves worked into one piece, FIG. 7 shows an opposed piston arrangement, which can be used according to the invention each time with a swash-plate engine assembly lying on the outside, FIG. 8 shows a longitudinal cut through an entire piston motor with swash-plate engine assembly, whose wobble rings are held each time with torsional strength by means of sets of gear rims.

In the case of the piston motor shown in FIG. 1, its cylinders 2 are arranged circularly around a shaft 1 and axparallel in a cylinder block 3. This arrangement of the cylinders 2 offers the advantage of small space requirements and of an extensive decrease in noise through avoidance of a stimulation of vibration of the motor housing, especially of the cylinder cover, and of the oil pan loacted in the case of traditional engines below the crank shaft. That is true particularly for the design of the piston motor in a six-cylinder two-stroke design in opposed piston arrangement, that is to say with altogether 12 pistons.

The shaft 1 for this purpose has been mounted doubly and thus statically fixedly and, to be sure, in radial bearings 48 lying centrally in relation to the cylinder block 3, which bearings can also be arranged within the cylinder block 3 itself. In addition, the shaft 1 has been executed with extremely large diameters in order to increase the flexural vibrations of the shaft 1 or jammings within the radial bearings 48, because of the forces of the pistons and the masses. In this form the shaft 1 may consist of light metals, for example even of aluminum, beryllium, magnesium or titanium alloys, for considerable engine performances, and, to be sure, even if the hollow shaft 1 has been developed with a relatively slight thickness of the wall.

In the case of a design of the piston motor in opposed piston arrangement according to FIG. 7, the shaft 1 passes centrally through the cylinder block 3 and, with the swash-plate engine assemblies T attached each time on the extreme side, constitutes a power system closed within itself, whereby even if the engine is positioned perpendicularly, the radial bearings 48 will be put under load only by the revolving or tumbling elements. The load diagram of the shaft 1 in the case of a horizontal position of the motor has been shown schematically in the upper part of FIG. 7.

On one or several sockets of the shaft 1 on the extreme end projecting from the cylinder block 3, a swash-plate engine assembly T has been rigidly attached as close as possible to the cylinder block 3. In the case of a design as an opposed piston engine, the previously described extremely large diameter of the shaft 1 will be particularly advantageous, if for no other than this reason, because it is merely simply put through the cylinder block 3 in the case of assembly of the engine and the swash-plate engine assembly T can be securely attached to the shaft 1 (at the front end 5 of said shaft 1) without additional flanges. As a result of that, the end of the shaft 1, projecting from the cylinder block 3 and the distance which helps to determine the bending moment, between one of the radial bearings 48 and the center of the swash-plate engine assembly T, can be kept extremely short. In the case of a design of the shaft 1 as a hollow shaft, the swash-plate engine assembly T with its rotational swash plate 4 is attached by means of screws 45 to a ring plate 7 attached sunkenly to the front end 5, whereby a stub shaft 8 engages inside the hollow shaft with a mounting element 9 attached there, with element is guided through the ring plate 7 and the swash plate 4 centrically with considerable play, as a result of which possible flexural vibrations of the end of the shaft can not be transferred to the stub shaft 8.

The stub shaft 8 from which the torque of the motor is taken may however also be attached directly in the hub of the rotational swash plate, whereby the rotational swash plate 4 can be attached, for example, through an arrangement of penetrating tightening screws on the front side of the shaft 1 or the front surface 9a of the mounting element 9. In the case of an opposed piston design, this attachment can be accomplished via a screw arrangement passing through the hollow shaft in an additionally stiffening braced manner. A centering shoulder 6 and/or an adjusting pin 46 takes over the easier centering, said pin also facilitating at the same time the adjustment of the precise position of the angle of rotation of the rotational swash plate 4 on the shaft 1. The attaching screws 45 can also pass through up to the mounting element 9. In this manner the rotational swash plate 4 will be connected in positive frictional contact with the front end 5 of the shaft 1 and the fact will also be used advantageously, that the flexural loads of shaft 1 revolve together with the rotational swash plate 4 in case of swash-plate engine assemblies of this type.

A wobble ring 10 held with torsional strength as against the cylinders 2 has been arranged inside the rotational swash plate 4, said ring being held with torsional strength via an axial guide joint 13 by a mounting device, which is arranged around the front end 5 of shaft 1 and has been supported with torsional strength in relation to the cylinders 2.

This mounting arrangement is at least limitedly radially movable at its end bearing the axial guide joint and lies in the direction of the rotational swash-plate 4, in order to guarantee a mounting of the axial guide joint 13 free of coercion, so that the axial guide joint 13 may escape radially from possible small countermovements coming from the power transfer system between the wobble ring 10 and the rotational swash plate 4. That means an increased useful life and simplified production.

In the design according to FIGS. 1 and 5, the supporting device has been subdivided in an axial direction into at least two sections, and it has at least two sets of claws, which can be shifted radially each time, intermeshing axially and arranged diametrically in relation to the axis of the shaft and twisted by 90° in relation to one another and which are independent of one another. In addition, the claws 55 of the intermediate part 14a of the sleeve engage with the grooves 57 on the cylinder block 3, while the two sections are connected with one another via claws and grooves.

The individual parts of the supporting device are held together in an axial direction by the rotational swash plates 4, if need be via an intermediate ring. Both parts guarantee thus a support of the axial guide joint by way of a universal joint in two main radial directions.

An element 14b (FIG. 6), made in one piece, can also serve as a supporting device, whose three claws 55 have arch-shaped flanks and thus assure the necessary full degree of freedom in radial direction.

However, this function can also be fulfilled by a tightening wedge coupling, in which the bearing pressures exerted by the motor elements, in case that the motor stands perpendicularly, will not impede a floating eccentric movement of the supporting device.

The sleeve 18 carries axial guide grooves 17 on its periphery, in which guide bodies 15 (for example, balls) are movable. FIG. 6 shows a special design 14b of a combination of the intermediate element 14a of the sleeve, with the sleeve 18 in one piece, and the guide grooves 17 already arranged axially fixedly on it, whereby the torsionally strong support, free of coercion in axial direction of this combined element, takes place through its claws 55 engaging in grooves on the cylinder block 3.

Axial guide grooves 16 on the inside diameter of the wobble ring 10 (absorbed by the rotational swash plate 4) form the outside mounting of the axial guide joint 13. A cage 14 encompassing the guide bodies 15 abuts during the rotating movement of the wobble ring 10 around the tumbling center Z against a supporting plate 19, which has been attached concentrically at the surface of the wobble ring 10 facing away from the cylinder block 3. But it is also possible to simply provide an alignable support on the rotational swash plate instead of such a supporting plate. At the same time, it is important in any case that the center of the tumbling plane of the cage and of its guide bodies should lie in the tumbling plane of the wobble ring.

The device for the torsional support of the wobble ring 10 in relation to the cylinder block 3 can, according to FIG. 8, also be executed in the form of two beveled gear rims 61 and 62, unrolling from one another, instead of as an axial guide joint, of which gear rim 61 is supported solidly by the cylinder block 3 but touches shaft 1 with its layer 65 of bearing material. The set of beveled gear rims 60 has been aligned with regard to the tumbling center 7.

The wobble ring 10 has been developed as a hollow section, enlarged in an axial direction and preferably in the shape of a box, and, to be sure, especially with larger hollow spaces 47 in a wobble ring body. The wobble ring 10 can be made first of all of two axial sections which have been connected firmly one with the other. One axial section at the same time can consist of the tray ring 58, which, according to FIG. 3, is firmly welded or else glued together with the other section in the course of assembly. According to the left half of FIG. 2, the individual hollow spaces 47, however, can also be closed from above by individual cover plates. The electron beam welding is particularly suitable for this welding process or else pulsation welding is suitable for the welding process, because thus a largely warpproof welding is possible without use of larger quantities of welding material. Also, the beveled gear rim 62 may be attached to the wobble ring 10 by means of these welding processes. Such a welding seam, which is accomplished within V-shaped wedge grooves into which the wires are welded by means of energy pulsation welding, has been shown in FIG. 4 as welding seam 80 and in FIG. 8 as welding seams 81, 82l and 82b as well as Through this special profiled fabrication of the wobble ring 10, it will be possible to countersink practically completely the connecting rod step bearings 12 each time with their pertinent, possibly cylindrical base sections 11 into the wobble ring 10. As a result of that, it will also be guaranteed that the pivotal points of the step bearings of the connecting rod are arranged in the center plane of the tumbling (with the tumble center Z), so that all operational movements connected with the tumbling movement will be reduced to the lowest possible measure, as a result of which a practically purely sinusoidal movement can be achieved with a correspondingly smooth running even in the case of momentary intermittent combustion, as in the case of diesel engines. Since the axial guide joint 13 with its swiveling center also lies in the tumbling center Z, the movement of its guide bores 15 is equal in both directions, so that they can not be jammed between the linear axial guide grooves 16 and 17.

Through the above mentioned arrangement of the wobble ring 10 and the step bearing 12 of the connecting rod intermeshing spatially, a considerably improved warping resistance and bending resistance of the wobble ring 10 will be achieved without the axial or radial dimensions of the swash-plate engine assembly increasing measurably, so that this will be possible to execute it as the optimum of a compact construction.

At the same time, the mass forces liberated in the case of high tumbling accelerations will be also held within controllable limits.

The special shape of the rotational swash-plate 4, which is open toward the cylinder block 3 and has been shaped pot-shaped in such a manner that it will absorb at least the greatest part of the wobble ring 10, serves the same purpose. At the same time, the edge section of the rotational swash plate 4 can be developed as a separate peripheral ring 21, which embraces the wobble ring 10.

In order to keep the mass forces created by the accelerating tumbling movement as low as possible, the material used can have a low specific weight, as for example in the case of light metal alloys (aluminum, beryllium, magnesium, titanium), since a high twisting and torsional strength has already been achieved through the special profiled fabrication. On the basis of the increased inherent stability, one can also use for the wobble ring 10, however, simpler unhardened steels, whereby, to be sure, a ring made of hard material must be attached around the wobble ring 10 (glued on, shrunk on) to carry the bearing surfaces of the element for the transmission of power. These bearing surfaces can also be developed only after attachment of the ring. The bearing surfaces can consist of a steel ring which is cast over a plastic model by way of the shell molding process and which can be hardened at the places which are under the most strain through carburizing. The connection of the bearing surfaces with the wobble ring 10 can likewise be accomplished by pulsation or electrobeam welding.

The wobble ring 10, which can be made rigid, must be much less elastically resilient in comparison to the rotational swash plate 4. The wobble ring 10 according to the invention, therefore, does not need to consist absolutely of highly elastic, heavy material either.

The manufacture of the wobble ring 10 provided especially with large hollow spaces, with the axial guide grooves 16 arranged fixedly, for example, on the inside diameter, can be accomplished by a casting made in precise correspondence or a drop forge element, in which the sleeve 18 with its axial guide grooves 17 or the piece of metal containing the guide grooves 17, can be cast in one operation process, whereby, after a precise common finishing treatment of these parts assigned precisely to one another as a result of that during operation, the separation is accomplished.

Between the inside diameter of the rotational swash plate 4 developed pot shaped and the outside diameter of the wobble ring 10, power transfer elements have been arranged, which can be executed as tapered roller bearings arranged in a plane of the rotational swash-plate according to FIG. 1, the rollers 20a or 20b of which have been arranged between their running surfaces 10a and 21a or 10 b and 21b alternatingly in such a manner, that the rotational axes (axles) R1 or R2 of the rollers 20a or 20b each time opposing each other by pairs approximately diagonally on the rotational swash plate 4 will run approximately parallel to one another in every rotational position of the rotational swash plate 4. This design of the bearing rollers 20a and 20b (two intermeshing bearings) arranged in one rotational plane of the axle under varying operating angles, where the forces to be transmitted are transferred by the total element in both axial directions, has been provided especially for smaller piston motors, while, for example, the arrangement shown in FIG. 3 absorbs larger forces, since in that case each time only half of the total rollers bear in one axial direction. In the case of the tapered roller bearings described, the individual tapered roller will strive to escape in axial direction and in the direction of its broadest diameter in accordance with the parallelogram of forces on the basis of a force that is to be transmitted depending on the inclination of the cone and according to the component of force which itself is proportional to the centrifugal forces of the roller. In order to reduce the friction caused by these forces, the rollers 20a and 20b have been rounded at their outside broader front surfaces, and they can be separately supported in the area of the apex of this rounding around its rotational axis, against forces directed in the direction of their rotational axis. Such a frictionless support has proven itself to be particularly advantageous for the bearings necessary for swash-plate engine assemblies which have a large diameter, because in the case of high r.p.m.'s relatively high centrifugal forces were found.

In order to achieve a particularly low friction coefficient, the rolling surfaces of the rollers 20a, 20b or of the rollers 22, 23 are made according to FIGS. 1 and 3 at least partially diverging in relation to the corresponding bearing surfaces 21a and 10b or 21a and 10a, so that the space created thereby can fill up with a circulating film of oil. Such wedge-like films of oil have a high bearing force and permit high r.p.m.'s, whereby also the roller bodies will achieve only about half the relative speed because they are sliding on the oil film.

FIG. 3 shows an arrangement of elements for the transfer of force in the form of a double roller bearing, in which the rotational axles of the truncated cone-shaped rollers 22 and 23 of the pertinent bearings are arranged at an angle in relation to one another and the double roller bearing absorbs axial tractive forces and pressure forces as well as radial forces. The power transfer element, located according to FIG. 1 in a rotational tumbling plane, in this case is arranged pulled apart into two rotational tumbling planes. In this case too, the axial forces are transmitted in both directions, however the roller path attached on the rotational swash plate A will transmit the pressure forces preponderantly, while the traction forces are absorbed mainly by the peripheral ring 21 encircling the wobble ring. In the case of this arrangement a similar action of the axial forces of the tapered rollers will occur per se, so that the front surfaces 22a or 23a, facing each other and being separately rounded, are supported against each other by a guide ring 24, which, in relation to the pertinent rollers 22 and 23, has the pertinent bearing surfaces 25 or 26 standing perpendicularly to the pertinent rotational axes.

In order to achieve a greater elasticity and carrying capacity of the rollers 22 or 23 resulting from that, a relatively wide axial bore 27 has been provided in these rollers, into which project centering pins 28, projecting perpendicularly from the bearing surfaces 25, 26 of the guide ring 24. At the same time, the rollers 22 and 23 are supported against the centrifugal forces in a ring area around the axial bore.

A resilient safety wire ring 29 has been arranged on the guide ring 24 for its easier centering on its outside periphery, which is held in the inside wall of the peripheral ring 21 of the pot-shaped rotational swash plate 4.

In FIG. 4, an arrangement is shown where the rollers from FIG. 3 are replaced by a double ball bearing, the balls 30 and 31 of which are supported punctiform against the bearing surfaces 25 and 26 of the guide ring 24 and where the rotational axle of the pertinent balls 30 and 31 passes through this point of contact.

According to FIG. 8, the balls 70 and 71 can also be guided in cage rings 73 and 74 and can be supported against centrifugal forces which have a special support between two polished lateral surfaces (for example 75) against the shaking motion of the wobble ring. Otherwise, the balls and rollers can also be made hollow for further saving in weight.

The step bearings 12 of the connecting rods with the pertinent base sections 11 are developed as hollow bodies according to FIGS. 1 and 3, and are provided with an eccentric oil bore 33, visible in FIG. 2, which bore connects during the piston path around the upper dead center an oil channel 34 in the connecting rod 35 with the oil supply space created in the hollow step bearing of the connecting rod, said space being connected with the entire lubricating oil supply. The oil accelerated thereby in the upward direction of the piston within the supply space will therefore be conveyed to the connecting rod bearing of the piston in the case of the reversal of piston 42 in the upper dead center from its inertia through the released oil channel 34. In the case of the downward movement following this reversal of the path, the oil bore 33 is closed by the foot pan 39 of the connecting rod, so that the oil will be pumped in each time in the area of the upper dead center in one direction into the oil channel 34. The supply of oil to the base sections 11 takes place each time via an inlet opening in the bottom of the wobble ring 10 and the interval between two membrane plates 34a fitting resiliently against the bottom of the wobble ring 10, which are connected with the center oil supply.

The cover holding the foot pan 39 of the connecting rod, which can be a simple snap ring 36, has been dimensioned such that the inside diameter of its upper ring 38 corresponds to the outside diameter of the foot pan 39 of the connecting rod, so that the latter can be inserted perpendicularly into the cover 36 without trouble during assembly and after assembly is kept by the ring 38 in continuous engagement through the operating circle corresponding to the tumbling movement of the wobble ring 10. For this purpose the outside diameter of the pan 39 can in any case be as much smaller as the inside diameter of the inside ring 38, so that the pan 39, in case the operating circle is covered by the pan 39 during operation, will be engaged over, at least still partially, by the bearing ring 37, whereby one must take into consideration that in the case of the swash-plate engine assembly described, traction forces on the step bearing 12 of the connecting rod hardly occur anyway and that the cover 36 or its bearing ring 37 can be dimensioned correspondingly weakly.

In FIG. 2, the disk-like circular ring segments attached as a mass equalizing device 43 have been shown, which in the case of this design consist of thin strips of sheetmetal and which have been clamped on by menas of screws 44 in order to produce in the case of mass production the required quick and easy and above all precise possibility for equalization.

In the opposite piston arrangement shown in FIG. 7, where the driving shaft is mounted in the cylinder block while the swash-plate engine assemblies are on both sides outside the cylinder block 3, an extraordinarily even torque was found. Besides, the best possible circulation of the combustion gases will be achieved through the fact that the inlet and outlet slits open and close staggered. In the case of a relatively slight additional expenditure, which results from the assembly of a second swash-plate engine assembly, almost double the performance increase occurs with only half the space requirement and while avoiding a double attachment of the additional aggregates.

The coaxially circular arrangement of the cylinders of the piston motor described and the likewise circular configuration of the swash-plate engine assembly permit the construction of an opposite piston motor, which operates in optimum compact construction with approximately half the unit power, which is correspondingly low as compared to the standard.

We claim:
1. An axial piston engine comprising:
 a fixed cylinder block having means defining a plurality of cylinders with opposed pistons, disposed about and paralleling the long axis of the engine;
 a straight, bend resistant, tubular shaft, bending only relatively very slightly when subject to forces exerted by fluctuating combustion pressures on said piston; two longitudinally spaced, radial bearings supporting the shaft on the cylinder block;
 an end of said shaft extending axially beyond one of said bearings and having means defining a radially extending annular flange at said end;
 a Swash-plate detachably mounted on said end of said shaft;
 a wobble ring;
 bearing means between the outer periphery of the wobble ring and the swash-plate, journalling the latter with respect to the former; and a plurality of connecting rod step bearing means being supported upon said wobble ring;
 the wobble ring being of hollow, box shaped radial section and the elastic yielding point of the swash-plate being substantially greater than that of the wobble ring.
2. The axial piston engine of claim 1,
 said swash-plate being disposed for rotation about a swash center in a position perpendicular to the longitudinal axis of said shaft;
 an annular counter bearing mounted coaxially adjacent each step bearing;
 a corresponding plurality of connecting rods, each having a foot pan having a concave front bearing surface for engagement with the respective step bearing means and an annular, convex rear bearing surface;
 the outer diameter of each foot pan being smaller than the internal dismeter of the respective annular counter bearings, so that said connecting rod foot pans may be axially aligned with said counter bearings for installation and removal, but are, while working, captured between the respective step bearings and counter bearings, the connecting rods being so configured that in every working position the connecting rod foot pans are out of axial alignment with said counter bearings.
3. The axial piston engine of claim 1 wherein the connecting rod step bearing means are recessed into the wobble ring throughout at least a major portion of the length of said connecting rod step bearing means.
4. An axial piston engine comprising:
 a fixed cylinder block having means defining a plurality of cylinders with opposed pistons, disposed about and paralleling the long axis of the engine;

a straight, bend resistant, tubular shaft, bending only relatively very slightly when subject to forces exerted by fluctuating combustion pressures on said piston; two, longitudinally spaced, radial bearings supporting the shaft on the cylinder block;

an end of said shaft extending axially beyond one of said bearings and having means defining a radially extending annular flange at said end;

a swash-plate detachably mounted on said end of said shaft;

a wobble ring;

bearing means between the outer periphery of the wobble ring and the swash-plate, journalling the latter with respect to the former; and a plurality of connecting rod step bearing means being supported upon said wobble ring;

said swash plate including a hub; and further comprising pretensioned bolts holding the swash-plate against said flange; and a power-take-off shaft extending through said hub and into the bore of said tubular shaft.

5. An axial piston engine comprising:
a fixed cylinder block having means defining a plurality of cylinders with opposed pistons, disposed about and paralleling the long axis of the engine;

a straight, bend resistant, tubular shaft, bending only relatively very slightly when subject to forces exerted by fluctuating combustion pressures on said piston; two longitudinally spaced, radial bearings supporting the shaft on the cylinder block;

an end of said shaft extending axially beyond one of said bearings and having means defining a radially extending annular flange at said end;

a swash-plate detachably mounted on said end of said shaft;

a wobble ring;

bearing means between the outer periphery of the wobble ring and the swash-plate, journalling the latter with respect to the former; and a plurality of connecting rod step bearing means being supported upon said wobble ring;

the wobble ring being of fabricated, electron beam welded construction.

6. An axial piston engine comprising:
a fixed cylinder block having means defining a plurality of cylinders with opposed pistons, disposed about and paralleling the long axis of the engine;

a shaft;

a swash-plate fixedly mounted on said shaft;

a wobble ring;

a plurality of connecting rods;

respective step bearings for said connecting rods supported by said wobble ring;

bearing elements in said swash-plate guiding the outer periphery of said wobble ring; rotation-fast retaining means holding said wobble ring for limited movement, radially with respect to the long axis of said cylinder block, whereby said wobble ring is held rotation-fast with respect to the cylinder block.

7. The axial piston engine of claim 6 wherein said rotation-fast retaining means is borne on said cylinder block via a supporting device independently mounted for limited radial movement around the outer periphery of said shaft.

8. The axial piston engine of claim 6 wherein said rotation-fast retaining means is borne directly upon said cylinder block.

9. The axial piston engine of claim 6 wherein said rotation-fast retaining means is disposed centrally within the inner periphery of said wobble ring.

10. The axial piston engine of claim 6 wherein said rotation-fast retaining means is an axial guide link disposed at the center of the swash element defined by said swash-plate and said wobble ring.

11. An axial piston engine comprising:
a fixed cylinder block having means defining a plurality of cylinders with opposed pistons, disposed about and paralleling the long axis of the engine;

a shaft;

a swash-plate fixedly mounted on said shaft;

a wobble ring;

a plurality of connecting rods;

respective step bearings for said connecting rods supported by said wobble ring;

bearing elements in said swash-plate guiding the outer periphery of said wobble ring; rotation-fast retaining means holding said wobble ring for limited movement, radially, with respect to the long axis of said cylinder block, whereby said wobble ring is held rotation-fast with respect to the cylinder block;

said bearing means being roller bearing elements disposed with means defining a flange-like enclosing ring on said swash plate, said roller bearing elements acting radially upon the wobble ring; said roller bearing elements being rounded off on the radially outermost extents thereof at the juncture of their radially outer peripheral surfaces and one end surface of each, to provide for formation of a wedge-shaped oil film between said roller bearing elements and said flange-like enclosing ring during running of the engine.

12. The axial piston engine of claim 11 wherein said roller bearing elements are guided in a race ring via guide pin means.

13. The axial piston engine of claim 12 further including polished surface means on the swash-plate laterally supporting said race ring against shaking movement of said wobble ring.

14. The axial piston engine of claim 11 wherein the bearing elements are provided in two groups of truncated cone rollers, the axes of rotation of the two groups being arranged for acceptance of both axial tensile and compressive stresses and radial stresses; the two groups being disposed at an angle to one another.

15. Axial piston engine as in claim 14, characterized in that the rollers (20a and 20b as well as 22 and 23) are provided with an additional axial hole (27) and are braced on their outer face.

16. Axial piston engine as in claim 14, characterized in that in a known cross roller bearing with roller element axes alternately shifted at an angle, the guide surfaces of one roller which is directed radially outward simultaneously act as the running surface for the other roller and vice versa.

17. Axial piston engine as in claim 14, characterized in that the rollers (22 and 23) are guided in guide pins on a cage (28).

18. Axial piston engine as in claim 14, characterized in that the rings which support the roller bearing elements (70, 71) are separately supported between two polished side surfaces (75) against the shaking movement of the swash ring (10).

19. An axial piston engine comprising:
a fixed engine block having means defining a plurality of cylinders aligned with the longitudinal axis of the block;

each cylinder reciprocally receiving a pair of opposed pistons;

a wobble ring at each end of the block;

a connecting rod for each piston; and a foot bearing for each connecting rod, each connecting rod being connected to a respective piston and having the respective foot bearing thereof supported by the respective wobble ring;

a straight central shaft;

a swash plate fixedly removably mounted on said shaft, whereby the wobble rings are fixed rotationally with respect to the cylinder block;

only two radial bearings supporting said shaft between the two wobble rings;

said shaft being but slightly flexible for absorbing forces exerted by explosive combustion within the cylinders between the opposed pistons, with permissible respectively slight flexing of said shaft;

a power take-off means coaxial with said shaft at at least one end of said shaft; and means securing the power take-off means to the shaft with respect to rotation of the shaft about the longitudinal axis thereof, for flexure of said shaft between said two radial bearings without corresponding flexure of said power take-off means, said power take-off means extending axially beyond said shaft.

20. The axial piston engine of claim 19 wherein:
said shaft is tubular; wherein said securing means is axially short compared to the shaft and the power take-off means and secures the power take-off means to the shaft adjacent one of said two radial bearings and wherein the power take-off means includes a stub shaft received over part of its length in the bore of said tubular shaft, there being substantial clearance between said shaft and said stub shaft to provide for flexure of said shaft between said two radial bearings without corresponding flexure of said power take-off means.

* * * * *

UNITED STATES PATENT OFFICE
CERTIFICATE OF CORRECTION

Patent No. 3,678,807        Dated July 25, 1972

Inventor(s) Hermann Papst

It is certified that error appears in the above-identified patent and that said Letters Patent are hereby corrected as shown below:

In the heading, line 30 was omitted and should appear as follows:

Foreign Application Priority Data

December 27, 1968    Germany    1817123.8

Signed and sealed this 9th day of January 1973.

(SEAL)
Attest:

EDWARD M. FLETCHER, JR.
Attesting Officer

ROBERT GOTTSCHALK
Commissioner of Patents